(No Model.)

P. A. SMITH.
CHECK REIN FOR HARNESS.

No. 357,794. Patented Feb. 15, 1887.

Witnesses:
Jas L. Gilbert
H. C. Hodley

Inventor:
Peter A. Smith per
H. F. Rohde, his
attorney.

ized.

UNITED STATES PATENT OFFICE.

PETER A. SMITH, OF BURLINGTON, IOWA.

CHECK-REIN FOR HARNESS.

SPECIFICATION forming part of Letters Patent No. 357,794, dated February 15, 1887.

Application filed April 5, 1886. Serial No. 197,901. (No model.)

*To all whom it may concern:*

Be it known that I, PETER A. SMITH, a citizen of the United States, residing at Burlington, in the county of Des Moines and State of Iowa, have invented a new and useful Improvement in Harness Check-Reins, of which the following is a specification.

My invention relates to harness check-reins in which a corrugated dog or catch operates in conjunction with an auxiliary rein; and the object of my invention is to furnish a check-rein simple in its construction and effective in its work. I attain this object by the mechanism illustrated in the accompanying drawings, in which—

Figure 1:
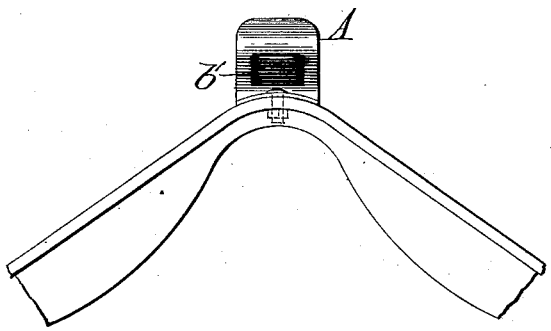
Figure 2:
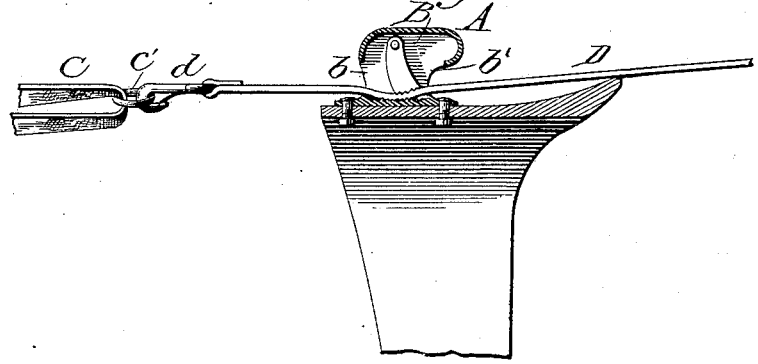

Figure 1 represents a front view of my check-rein. Fig. 2 represents a vertical cross-section thereof.

Similar letters of reference indicate similar parts throughout the several views.

In the drawings, A represents a box or frame of any suitable shape, and preferably made of metal. Box A has in front the elongated slit or opening $b$, and at the back the corresponding opening, $b'$. In the inside of the box A is the pivoted dog B, of the shape as illustrated in the drawings, or of any other suitable shape. This dog B is in its lower part corrugated and so adjusted in the box A that its lower part will loosely rest upon the bottom of box A. The bottom of box A, where the dog B comes in contact with it, is also corrugated. Box A is, by means of bolt or otherwise, firmly fastened to any harness-saddle.

C represents any ordinary check-line, having ring $c'$.

D is an auxiliary rein, having snap-hook $d$. Rein D passes through opening $b$, between dog B and the bottom of the box, and through opening $b'$ to the hands of the driver.

The operation of my invention is as follows:

The snap-hook $d$ is hooked into ring $c'$, and the apparatus is ready for work. If I now desire to tighten the check-rein, I pull the rein D. Rein D is prevented from slipping back by means of dog B, which will grab the rein D as soon as any pull is brought to bear upon rein D from the front or the horse's head. This is done by means of pressing rein D firmly against the corrugated bottom of box A. The grip of the dog B can be loosened by the driver by means of tightening rein D, and while held tight let it gradually slip forward. It will be seen that in this manner the horse can be checked up and unchecked in different degrees of tightness, and that the driver can control this from his seat without leaving it.

The shape of box A may be of any suitable design, or it may be a mere frame instead of a box, or it may be of the shape of a hook.

I am aware that it is not broadly new to employ a serrated dog in combination with a box as a check-rein adjusting device; hence I do not broadly claim such a combination; but my purpose has been to construct and arrange the parts of my device so as to permit their employment with an ordinary rein or strap, D, of uniform thickness, and to avoid the use of a spring or springs to control the dog.

What I claim is—

The combination, with the check-rein and the auxiliary rein removably attached thereto, of a box, A, provided with a corrugated bottom, substantially as shown, and a gravity-dog, B, pivotally secured within the box and corrugated on its lower end to act in conjunction with the corrugated bottom of the box, all operating substantially as described.

PETER A. SMITH.

Witnesses:
 THOS. JOHNSTON,
 J. P. WALLACE.